United States Patent
Oka et al.

(10) Patent No.: US 9,434,328 B2
(45) Date of Patent: Sep. 6, 2016

(54) HARNESS INCLUDING A FITTING HAVING A SWAGED PORTION

(71) Applicant: Hitachi Metals, Ltd., Tokyo (JP)

(72) Inventors: Fumihito Oka, Hitachi (JP); Hirotaka Eshima, Hitachi (JP); Nobuyuki Yamashita, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/477,668

(22) Filed: Sep. 4, 2014

(65) Prior Publication Data

US 2015/0075862 A1    Mar. 19, 2015

(30) Foreign Application Priority Data

Sep. 19, 2013  (JP) ................. 2013-194277

(51) Int. Cl.
| | | |
|---|---|---|
| H02G 11/00 | (2006.01) | |
| B60R 16/02 | (2006.01) | |
| H01B 7/282 | (2006.01) | |
| H02G 3/06 | (2006.01) | |
| H01R 4/20 | (2006.01) | |
| H01R 9/05 | (2006.01) | |
| H01R 4/18 | (2006.01) | |

(52) U.S. Cl.
CPC ........... B60R 16/0215 (2013.01); H01B 7/282 (2013.01); H01R 4/20 (2013.01); H01R 9/0518 (2013.01); H02G 3/0616 (2013.01); H01R 4/183 (2013.01)

(58) Field of Classification Search
CPC .................................................... H01B 7/0045
USPC ....................... 174/71 C, 75 C, 172
See application file for complete search history.

(56) References Cited

U.S. PATENT DOCUMENTS

| | | | | |
|---|---|---|---|---|
| 3,539,709 | A * | 11/1970 | Brancaleone ................ | 174/75 C |
| 4,613,199 | A * | 9/1986 | McGeary ............. | H01R 9/0518 |
| | | | | 439/585 |
| 7,893,354 | B2 * | 2/2011 | Albert ................. | B60R 16/0222 |
| | | | | 174/72 A |
| 8,343,167 | B2 * | 1/2013 | Henson ................. | A61B 17/221 |
| | | | | 606/108 |
| 9,040,826 | B2 * | 5/2015 | Oka ......................... | H01B 5/10 |
| | | | | 174/113 C |
| 2004/0197057 | A1 * | 10/2004 | Lee ......................... | G02B 6/443 |
| | | | | 385/100 |
| 2010/0270054 | A1 * | 10/2010 | Oka ......................... | H01B 5/10 |
| | | | | 174/107 |
| 2013/0206889 | A1 * | 8/2013 | Ochiai .................... | A01K 89/00 |
| | | | | 242/322 |

FOREIGN PATENT DOCUMENTS

JP        2007-299819 A     11/2007

* cited by examiner

*Primary Examiner* — Hoa C Nguyen
*Assistant Examiner* — Stanley Tso
(74) *Attorney, Agent, or Firm* — McGinn IP Law Group PLLC

(57) ABSTRACT

A harness includes an electric cable including an electric wire section and a protecting section to protect the electric wire section, a cable clamp including a cylindrical portion, and a ring shaped metallic fitting being larger in diameter than the cylindrical portion. The electric wire section is inserted inside the cylindrical portion. The protecting section is fitted around outside the cylindrical portion. The ring shaped metallic fitting is mounted around outside the fitted protecting section. The electric cable and the cable clamp are combined together by swaging of the mounted ring shaped metallic fitting.

15 Claims, 3 Drawing Sheets

HARNESS INCLUDING A FITTING HAVING A SWAGED PORTION

The present application is based on Japanese patent application No. 2013-194277 filed on Sep. 19, 2013, the entire contents of which are incorporated herein by reference.

BACKGROUND OF THE INVENTION

1. Field of the Invention

This invention relates to a harness configured by use of an electric cable and a cable clamp.

2. Description of the Related Art

In recent years, due to widespread use of robots, electrical equipment for automobiles, etc., electric cables have been used even in environments where they undergo repeated bendings. It is known that the electric cables of this type have a structure in which an electric wire section is configured by use of one or more electric wires and is protected with a sheath therearound.

Also, a known method to fix the electric cable is to use a cable clamp. Specifically, that known method fixes the electric cable by integrally forming a cylindrical portion on the cable clamp, inserting the electric cable into that cylindrical portion, and swaging that cylindrical portion.

Refer to JP-A-2007-299819, for example.

SUMMARY OF THE INVENTION

Now, when as described above, the electric cable is inserted into the cylindrical portion of the cable clamp and the cylindrical portion is swaged, the larger amount of deformation of the cylindrical portion results from the swaging, the stronger electric cable gripping force (herein also simply referred to as "gripping force" or "cable gripping force") the cylindrical portion has. For this reason, when the electric cable is desired to be fixed with a stronger gripping force for the purpose of e.g., enhancing reliability when used for automobiles, it is necessary to increase a swaging load. The swaging load refers to a load applied to the cylindrical portion when the cylindrical portion is swaged using a swaging tool.

However, increasing the swaging load when swaging the cylindrical portion of the cable clamp leads to an increase in mechanical load acting on the electric wire section of the electric cable. A reason therefor is as follows. In general, electric cables are structured to be externally protected with a sheath (jacket). Also, the sheath is formed of a rubber material. Due to this, when the electric cable is inserted into the cylindrical portion of the cable clamp and the cylindrical portion is swaged, a tightening force resulting from the swaging is transmitted through the sheath to the electric wire section. Therefore, the increasing of the swaging load leads to a corresponding increase in load acting on the electric wire section.

A principal object of the invention is to provide a technique for, when an electric cable is fixed to a cable clamp by swaging, being able to enhance cable gripping force without increasing a load acting on an electric wire section of the electric cable.

According to an embodiment of the invention, a harness comprises:

an electric cable including an electric wire section and a protecting section to protect the electric wire section;

a cable clamp including a cylindrical portion, the electric wire section being inserted inside the cylindrical portion, the protecting section being fitted around outside the cylindrical portion; and a ring shaped metallic fitting being larger in diameter than the cylindrical portion and being mounted around outside the fitted protecting section, wherein the electric cable and the cable clamp are combined together by swaging of the mounted ring shaped metallic fitting.

In the embodiment, the following modifications and changes may be made.

(i) The protecting section includes a cylindrical sheath including an inner surface, and a braid layer covering the inner surface of the sheath, and the sheath is in contact with a swaged inner surface of the ring shaped metallic fitting while the braid layer is in contact with an outer surface of the cylindrical portion.

(ii) The harness further comprises:

a waterproofing resin covering an end of the protecting section fitted around outside the cylindrical portion.

(iii) The electric wire section includes a conductor and a shield braid layer provided around an outer circumferential side of the conductor, and the shield braid layer is in contact with the cylindrical portion.

(Points of the Invention)

The invention allows for, when the electric cable is fixed to the cable clamp by swaging, being able to enhance cable gripping force without increasing a load acting on the electric wire section of the electric cable.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
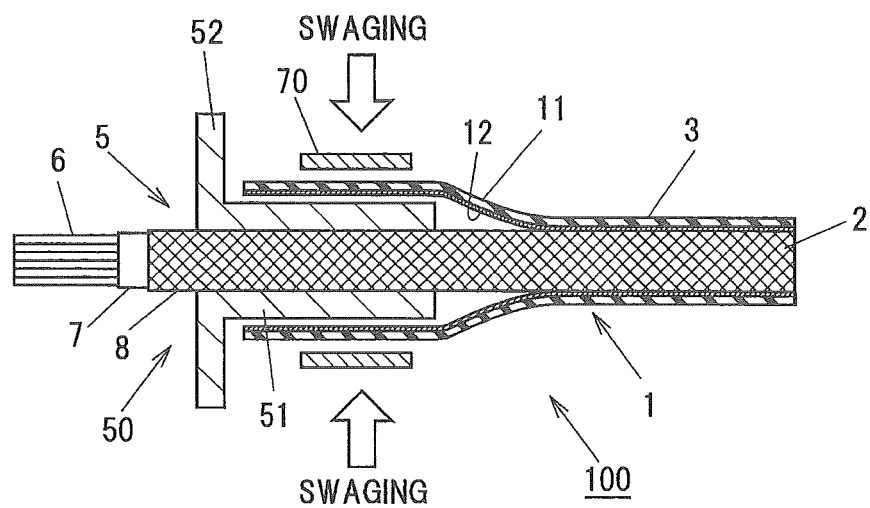
FIG. 1 is a cross sectional view showing a configuration example of an essential portion of a harness in an embodiment according to the invention.

Below is described an embodiment according to the invention in detail, in conjunction with the accompanying drawings. In the embodiment according to the invention, the following descriptions are in turn given:

1. Harness outline
2. Electric cable configuration
3. Technical significance of providing a reinforcing braid layer
4. Cable clamp configuration
5. Ring shaped metallic fitting configuration
6. Harness configuration
7. Harness attachment
8. Functions and advantageous effects of the embodiment 9. Modifications <1. Harness Outline>

Figure 2:
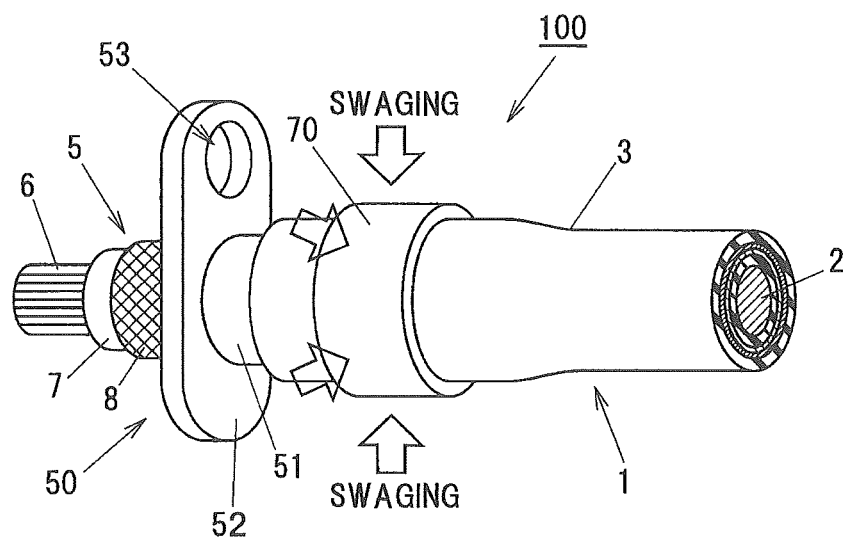
FIG. 2 is a perspective view showing the configuration example of the essential portion of the harness in the embodiment according to the invention.

FIG. 1 is a cross sectional view showing a configuration example of an essential portion of a harness 100 in an embodiment according to the invention, and FIG. 2 is a perspective view showing the same. The harness 100 illustrated is configured to include an electric cable 1, a cable clamp 50, and a ring shaped metallic fitting 70. Below are described, in turn, respective configurations of the parts 1, 50, and 70, followed by a configuration of the harness 100 with those parts 1, 50, and 70 combined together.

<2. Electric Cable Configuration>

Figure 3:
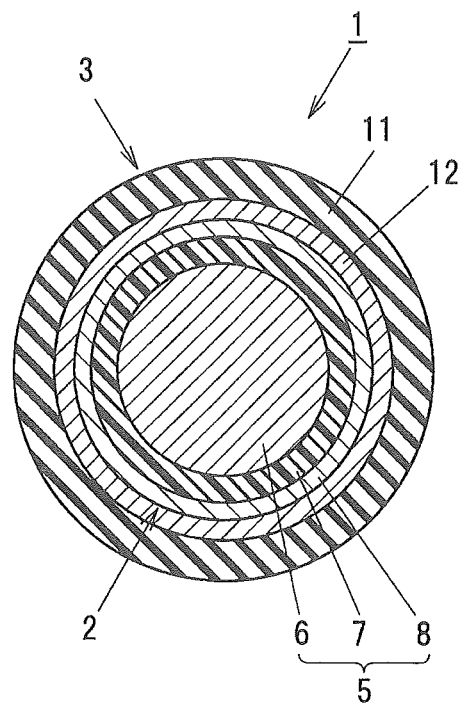
FIG. 3 is a cross sectional view showing a configuration example of an electric cable.

Referring first to FIG. 3, a configuration of the electric cable 1 is described. The electric cable 1 illustrated has moderate flexibility, and is configured to mainly include an electric wire section 2 and a protecting section 3 to protect that electric wire section 2. Note that, herein, a longitudinal direction of the electric cable 1 is termed "cable longitudinal direction," and a diameter direction of the electric cable 1 is termed "cable diametrical direction."

(Electric Wire Section)

The electric wire section 2 is arranged inside the protecting section 3. The electric wire section 2 is configured as one electric wire 5. The electric wire 5 includes a conductor 6, an insulator 7, which covers a circumference of that conductor 6, and a shield braid layer 8, which covers a circumference of that insulator 7.

(Conductor)

The conductor 6 is located around a central axis of the electric wire 5 as a core wire of the electric wire 5. The conductor 6 may be formed using e.g., a linear conductor made of tinned soft copper (as one example, conductor cross section (SQ)=3 mm$^2$). The conductor 6 may be configured as one linear conductor, or a stranded wire comprising a plurality of linear conductors stranded together. Also, the conductor 6 may be formed using a metal wire such as an annealed copper wire, silver plated annealed copper wire, tinned copper alloy wire, or the like.

(Insulator)

The insulator 7 is formed concentrically with the conductor 6 so as to cover an entire outer circumferential surface of that conductor 6. The insulator 7 is formed with a constant thickness dimension (e.g., a thickness of 0.7 mm). For example, the insulator 7 may be formed of cross-linked polyethylene (XLPE). Also, the insulator 7 may be formed of a resin material such as polyethylene, polyethylene foam, cross-linked polyethylene foam, polypropylene, fluoric resin, or the like.

(Shield Braid Layer)

The shield braid layer 8 has an electrical shielding function and is formed around an outer circumferential side of the conductor 6 so as to cover an entire outer circumferential surface of the insulator 7. The shield braid layer 8 is formed concentrically with the insulator 7 around the conductor 6 at a core. The shield braid layer 8 may be formed using a copper foil thread with a copper foil provided around a core thereof made of a fiber or a thread. The shield braid layer 8 is formed by crossing and twisting, so-called braiding a plurality of copper foil threads. Note that, in the present embodiment, the fiber refers to a fine threadlike form. Also, the thread refers to a linearly continuous fiber form.

The core of the copper foil thread used in formation of the shield braid layer 8 may comprise a fiber or a thread made of a polymeric resin material. Specifically, the copper foil thread may be configured using a 0.11 mm diameter core thread of polyethylene terephthalate (PET), for example. The core thread may be formed from one fiber or thread. Also, the core thread may be formed by braiding a plurality of fibers or threads together. The copper foil may be formed with a thickness of 12 μm, for example. And, the copper foil thread may be formed by helically wrapping a copper foil around a circumference of the core thread.

Also, the copper foil thread may be formed by applying a plating film to its surface. The application of the plating film to the surface of the copper foil thread allows for preventing oxidation of the surface of the copper foil. The plating film may be formed by tin plating, for example. Preventing the oxidation of the surface of the copper foil by the use of the plating film allows for suppressing an adverse effect such as an increase in electrical resistance of the shield braid layer 8.

(Protecting Section)

The protecting section 3 is arranged concentrically around outside the electric wire section 2. The protecting section 3 may be configured as only a cylindrical sheath 11, but, in the present embodiment, it preferably includes the sheath 11 and a reinforcing braid layer 12, which covers an inner surface of that sheath 11. Of the sheath 11 and the reinforcing braid layer 12, the reinforcing braid layer 12 is provided as one example of the braid layer.

(Sheath)

The sheath 11 constitutes an outer coating of the electric cable 1. The sheath 11 is formed in a circular cross section shape. It results in the entire protecting section 3 being formed in a circular cylindrical shape. The sheath 11 is located around an outermost side in the cable diametrical direction. It results in the outer circumferential surface of the sheath 11 constituting the outer circumferential surface of the electric cable 1. The sheath 11 is formed of an electrical insulating material. Specifically, the sheath 11 is formed with a thickness of e.g., the order of 0.5 mm using a rubber material such as ethylene propylene diene rubber or the like. The rubber material used in forming the sheath 11 preferably fulfills excellent heat resistance, weather resistance, and oil resistance properties. As one example, a brake hose rubber material may be used.

The brake hose rubber material may comprise an ethylene alpha-olefin polyene copolymer, which is formed by including a polyene, which is a norbornene compound terminally containing a vinyl group. Also, the rubber material may comprise a mixed rubber material including an ethylene alpha-olefin polyene copolymer, which is formed by including a polyene, which is a norbornene compound terminally containing a vinyl group, and a SiH group containing compound, which includes a plurality of SiH groups in one molecule. Note that as long as the mixed rubber material fulfills the function of sheath 11, the mixed rubber material may appropriately include compounding agents such as a reinforcing agent, a filler, a plasticizer, a softener, a processing aid, an activator, an antiscorching agent and an antiaging agent. Also, the mixed rubber material may be formed by blending a plurality of polymeric materials.

Also, the rubber material may comprise ethylene propylene diene rubber, styrene butadiene rubber, butyl rubber, nitrile rubber or chloroprene rubber. In this embodiment, it is preferable to use the pressureless vulcanizable mixed rubber material as the rubber material. Note that the constituent ethylene alpha-olefin polyene copolymer of the mixed rubber material is a ter-, or higher copolymer including ethylene, alpha olefin and polyene, and as one example, may comprise ethylene propylene diene rubber (EPDM).

The alpha olefin may comprise propylene, 1-butene, 4-methyl-1-pentene, 1-hexene, 1-heptene, 1-octene, or the like. Furthermore, the polyene typified by dienes may comprise dicyclopentadiene, 1,4-hexadiene, 3-methyl-1,4-hexadiene, 5-methyl-1,4-hexadiene, 7-methyl-1,6-octa-diene, 5-ethylidene-2-norbornene, 5-methylene-2-norbornene, 5-vinyl-2-norbornene, or the like.

The constituent SiH group containing compound of the mixed rubber material is used as a cross linker for the mixed rubber material. In this embodiment, it is preferred to use the SiH group containing compound which includes in one molecule two, or preferably three or more SiH groups for the purpose of enhancing the degree of cross-linkage. Note that the mixed rubber material may contain a catalyst, and a reaction inhibitor. The catalyst uses a catalyst to accelerate a hydrosilylation reaction between the ethylene alpha-olefin polyene copolymer and the SiH group containing compound. The catalyst may comprise e.g., a platinum based catalyst, a palladium based catalyst, a rhodium based catalyst, or the like.

Also, the reaction inhibitor is appropriately added to the mixed rubber material for the purpose of inhibiting the excessive hydrosilylation reaction. The reaction inhibitor may comprise e.g., a benzotriazole, a hydroperoxide, an ethynyl cyclohexanol, tetramethylethylene diamine, triallyl cyanurate, acrylonitrile, acrylic maleate, or the like.

(Reinforcing Braid Layer)

The reinforcing braid layer 12 is formed to cover the entire inner circumferential surface of the sheath 11. The reinforcing braid layer 12 is formed concentrically with the sheath 11 by adhering (bonding) to the inner circumferential surface of the sheath 11. The reinforcing braid layer 12 and the shield braid layer 8 are adjacent to each other in the cable diametrical direction. Also, the reinforcing braid layer 12 is formed by crossing and twisting, so-called braiding of a plurality of fibers or threads. The fibers or threads are formed with a diameter of 0.1 mm using a synthetic resin such as polyvinyl alcohol or the like. Also, it is preferred that the fibers or threads are formed of a material being excellent in fatigue resistance and abrasion resistance. The fibers or threads may be formed of e.g., at least one selected from, besides polyvinyl alcohol, polyethylene terephthalate or polyethylene-2,6-naphthalate. The fibers or threads to form the reinforcing braid layer 12 may preferably be formed by using polyvinyl alcohol.

<3. Technical Significance of Providing the Reinforcing Braid Layer>

In this embodiment, the reinforcing braid layer 12 is provided around the inner circumference of the sheath 11. There are two main technical significances of providing the reinforcing braid layer 12 in the electric cable 1. The first technical significance is to enhance a gripping force when the electric cable 1 is fixed by swaging of the ring shaped metallic fitting 70. That is, the reinforcing braid layer 12 is provided around the inner circumference of the sheath 11 so that, when the ring shaped metallic fitting 70 is swaged by being fitted around outside the electric cable 1, a finely uneven surface of the reinforcing braid layer 12 is acted on by a tightening force resulting from the swaging and bitten into the inner circumferential surface of the sheath 11. It results in a so-called anchoring effect at a contact interface between the sheath 11 and the reinforcing braid layer 12. Accordingly, the swaged portion has the sufficient gripping force, even if the tightening force for the sheath 11 resulting from the swaging of the ring shaped metallic fitting 70 is not so great.

The second technical significance is to enhance a tensile strength of the electric cable 1. That is, the reinforcing braid layer 12 with the polyethylene terephthalate fibers or the like twisted together is provided around the inner circumference of the sheath 11 so that when for some reason the electric cable 1 is acted on by a tensile force in the cable longitudinal direction, an elongation of the entire cable 1 is reduced by the reinforcing braid layer 12. This mitigates the damage to the electric wire section 2 when the electric cable 1 is acted on by the tensile force. Accordingly, it is possible to enhance the tensile strength of the electric cable 1.

<4. Cable Clamp Configuration>

Next, a configuration of a cable clamp 50 is described. The cable clamp 50 is designed to fix the above described electric cable 1, and is suitable particularly for use when fixing a terminal of the electric cable 1. The cable clamp 50 is formed by use of a metal being non-magnetic and high in electrical conductivity, such as aluminum or an aluminum alloy (duralumin or the like). The cable clamp 50 mainly integrally includes a cylindrical portion 51 and a flange 52.

(Cylindrical Portion)

The cylindrical portion 51 is formed in a circular cylindrical shape. The cylindrical portion 51 is formed for the electric wire section 2 (the electric wire 5) of the above described electric cable 1 to be inserted therein. Specifically, an inner diameter of the cylindrical portion 51 is configured to be the same as or slightly larger than an outer diameter of the electric wire section 2. This allows the electric wire section 2 to be inserted into the cylindrical portion 51. That is, the cylindrical portion 51 is formed with a hole for the electric wire section 2 to be inserted therein. Also, the cylindrical portion 51 is formed in such a manner as to project from the flange 52 in one thickness direction of the flange 52.

(Flange)

The flange 52 is formed in a plate shape. The thickness direction of the flange 52 is the same as a central axis direction of the cylindrical portion 51. The flange 52 is formed in a substantially rectangular shape when viewed in the central axis direction of the cylindrical portion 51. The flange 52 is formed with a fixing hole 53. The fixing hole 53 is adapted to fix the cable clamp 50 to an electronic device chassis not shown. The fixing hole 53 is formed in such a manner as to penetrate the flange 52 outward relative to the cylindrical portion 51. The electronic device is one of electronic devices to be electrically connected together by use of the electric cable 1.

<5. Ring Shaped Metallic Fitting Configuration>

The ring shaped metallic fitting 70 is designed to fix the electric cable 1 to the cable clamp 50 by swaging. The ring shaped metallic fitting 70 is formed in a circular ring shape. The ring shaped metallic fitting 70 is formed to be larger in diameter than the cylindrical portion 51 of the cable clamp 50. Specifically, an inner diameter of the ring shaped metallic fitting 70 is configured to be a dimension including the outer diameter of the cylindrical portion 51 plus a thickness dimension of the protecting section 3, so as to mount the ring shaped metallic fitting 70 around outside that protecting section 3 with the protecting section 3 fitted around outside the cylindrical portion 51. A length in the central axis direction of the ring shaped metallic fitting 70 is configured to be shorter than a length in the central axis direction of the cylindrical portion 51. Also, the ring shaped metallic fitting 70 is formed using, for example the same metal material as that of the cable clamp 50. It should be noted, however, that this invention is not limited thereto, but the cable clamp 50 and the ring shaped metallic fitting 70 may be configured with different metal materials, respectively. Also, for mechanical properties of the metal materials, the cable clamp 50 may be configured with the more rigid metal material than the metal material of the ring shaped metallic fitting 70.

<6. Harness Configuration>

Next, a configuration of a harness 100 is described. By combining together the above configured electric cable 1, the above configured cable clamp 50 and the above configured ring shaped metallic fitting 70, the harness 100 is provided as the electric cable 1 with the clamp 50. Specifically, those parts are assembled together as follows. That is, as shown in FIGS. 1 and 2, the electric wire section 2 (the electric wire 5) of the electric cable 1 is inserted inside (into the hole of) the cylindrical portion 51 of the cable clamp 50. At this point, the electric wire section 2 is inserted from the left side of FIG. 1 into the cylindrical portion 51 of the cable clamp 50 and drawn from the cylindrical portion 51 to the right side of FIG. 1. Lengths of the electric wire section 2 and the protecting section 3 in the electric cable 1 are pre-adjusted so that the electric wire section 2 is drawn from the cylindrical portion 51 by a predetermined dimension.

It is desirable that with the electric wire section 2 (the electric wire 5) inserted in the cylindrical portion 51 in this manner, a suitable space is ensured therebetween by configuring the inner diameter of the cylindrical portion 51 to be slightly larger than the outer diameter of the electric wire section 2. There are two main reasons therefor: One reason is because the insertion of the electric wire section 2 into the cylindrical portion 51 is facilitated. The other reason is because the interposition of the aforementioned space allows the electric wire section 2 to be freely movable (slidable) in the central axis direction of the cylindrical portion 51 to thereby mitigate the load acting on the electric wire section 2 when the electric cable 1 is bent.

The protecting section 3 of the electric cable 1 is fitted around outside the cylindrical portion 51 of the cable clamp 50. At this point, the cylindrical portion 51 is inserted in the cable diametrical direction between the electric wire section 2 and the protecting section 3. It results in the protecting section 3 of the electric cable 1 being pressed, spread outward and fitted around outside the cylindrical portion 51. Also, the reinforcing braid layer 12 of the protecting section 3 is in contact with an outer circumferential surface of the cylindrical portion 51.

Then, the ring shaped metallic fitting 70 is mounted around outside the protecting section 3 fitted around the cylindrical portion 51. The ring shaped metallic fitting 70 is passed around the electric cable 1 beforehand, and after as described above, the protecting section 3 is fitted around outside the cylindrical portion 51, is moved toward the electric cable 1 and mounted therearound. It results in an inner circumferential surface of the ring shaped metallic fitting 70 being in contact with or proximity to the outer circumferential surface of the sheath 11.

Then, the ring shaped metallic fitting 70 is externally swaged with a swaging tool, thereby resulting in the electric cable 1 and the cable clamp 50 being combined (integrated) together. For the ring shaped metallic fitting 70, a swaging location therearound is roughly predetermined so that the swaging tool is brought into contact with that swaging location around the ring shaped metallic fitting 70 to externally apply a swaging load to the ring shaped metallic fitting 70. It results in an outer circumferential surface of the ring shaped metallic fitting 70 being acted on by the swaging load applied by the swaging tool, deformed and depressed inward. At this point, the protecting section 3 fitted around outside the cylindrical portion 51 is sandwiched between that cylindrical portion 51 and the ring shaped metallic fitting 70. It results in the protecting section 3 being gripped by the swaged portion (i.e. the deformed and depressed portion) of the ring shaped metallic fitting 70 with a gripping force to fix the electric cable 1 to the cable clamp 50.

As described above, the assembling together of the electric cable 1, the cable clamp 50 and the ring shaped metallic fitting 70 results in the harness 100 with those parts 1, 50 and 70 integrally combined together. <7. Harness Attachment>

When the harness 100 is attached to the aforementioned electronic device chassis, one surface of the flange 52 is brought into contact with a side surface of the electronic device chassis. Then, a bolt (not shown) is passed through the fixing hole 53 of the flange 52, and a male threaded portion of the bolt is screwed and tightened into a female threaded portion provided on the electronic device chassis. It results in the harness 100 being attached to the electronic device chassis.

Incidentally, when the harness 100 in the present embodiment is mounted on an automobile, electronic devices (a power supply, an inverter, a controller, etc.), which are arranged on a vehicle body, and electronic devices (an in wheel motor, an electric brake, sensors of each type, etc.), which are arranged in wheel portions under a spring, are electrically connected together with the electric cable 1, and the cable clamp 50 is attached to the chassis of the electronic devices of each type using the aforementioned bolts.

<8. Functions and Advantageous Effects of the Embodiment>

The embodiment according to the invention adopts the configuration with the electric cable 1 and the cable clamp 50 combined together by inserting the electric wire section 2 inside the cylindrical portion 51 of the cable clamp 50, fitting the protecting section 3 around outside the cylindrical portion 51, and externally swaging the ring shaped metallic fitting 70 mounted around outside that protecting section 3. With this configuration, when the ring shaped metallic fitting 70 is swaged, the tightening force (swaging load) resulting from the swaging acts on the cylindrical portion 51 with the protecting section 3 between that cylindrical portion 51 and the ring shaped metallic fitting 70. For this reason, the tightening force resulting from the swaging is not likely to be transmitted to the electric wire section 2. Accordingly, it is possible to, when swaging the ring shaped metallic fitting 70, greatly reduce the load acting on the electric wire section 2.

Also, when the ring shaped metallic fitting 70 is mounted and swaged around outside the protecting section 3 fitted around outside the cylindrical portion 51, the protecting section 3 is sandwiched between the cylindrical portion 51 and the ring shaped metallic fitting 70 with the tightening force resulting from the swaging. For this reason, the tightening force resulting from the swaging becomes a gripping force to sandwich the protecting section 3 and concentrates on the protecting section 3. Accordingly, the swaged portion of the ring shaped metallic fitting 70 has the sufficient gripping force, even if the ring shaped metallic fitting 70, when swaged, is not so greatly deformed.

Particularly when, as the configuration of the protecting section 3, the reinforcing braid layer 12 is provided around the inner circumference of the sheath 11, the sheath 11 at the swaged portion of the ring shaped metallic fitting 70 is in contact with the inner circumferential surface of the ring shaped metallic fitting 70, while the reinforcing braid layer 12 at the swaged portion of the ring shaped metallic fitting 70 is in contact with the outer circumferential surface of the cylindrical portion 51. With this configuration, the reinforcing braid layer 12, when acted on by the tightening force resulting from the swaging, is strongly pressed against the sheath 11 due to a reaction force from the cylindrical portion 51. This allows the finely uneven surface of the reinforcing braid layer 12 to be bitten into the inner circumferential surface of the sheath 11. Accordingly, it is possible to dramatically enhance the electric cable 1 gripping force of the cable clamp 50.

Also, since the electric cable 1 gripping force of the cable clamp 50 is enhanced, when the electric cable 1 is acted on by the tensile force in the cable longitudinal direction, the elongation of the electric cable 1 due to this tensioning is securely suppressed by the sheath 11 with the reinforcing braid layer 12. For this reason, the tensile force is not likely to act on the electric wire section 2. Accordingly, it is possible to mitigate the mechanical load on the electric wire section 2 due to the tensioning of the electric cable 1. Also, it is possible to securely prevent the slipping of the electric cable 1 due to the tensioning of the electric cable 1.

Also, if the electric cable 1 fixed by using the cable clamp 50 is bent for some reason, the electric wire section 2 and the protecting section 3 of the electric cable 1 are held separate from each other in the cable diametrical direction in the vicinity of the cable clamp 50. For this reason, the shield braid layer 8 of the electric wire section 2 and the reinforcing braid layer 12 of the protecting section 3 are not in friction. Accordingly, it is possible to avoid abrasion due to the friction between the braid layers 8 and 12.

<9. Modifications>

The technical scope of this invention is not limited to the above described embodiment, but includes various alterations and improvements that derive the specific advantageous effects from the requirements for the configuration of the invention and combinations thereof.

Figure 4:
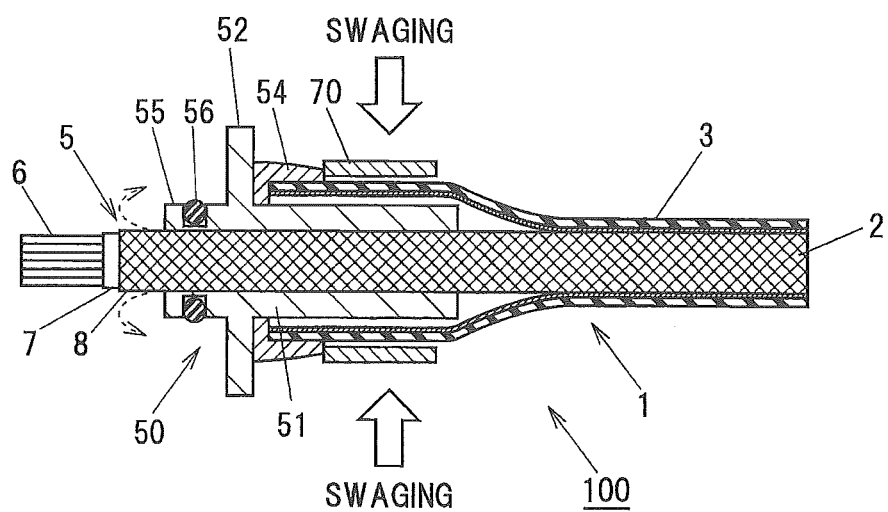
FIG. 4 is a cross sectional view showing another configuration example of the harness in the embodiment according to the invention.

For example, in the above described embodiment, by swaging the ring shaped metallic fitting 70 mounted around outside the protecting section 3, the inner circumferential surface of the ring shaped metallic fitting 70 is pressed against the outer circumferential surface of the protecting section 3 and the inner circumferential surface of the protecting section 3 is pressed against the outer circumferential surface of the cylindrical portion 51. For this reason, the swaged portion of the ring shaped metallic fitting 70 has some degree of waterproofing effect because of the adhesion between the parts. It should be noted, however, that, in the circumferential direction of the ring shaped metallic fitting 70, the swaging tool is pressed against the ring shaped metallic fitting 70 in multiple directions at a predetermined angle pitch. For this reason, in ring shaped metallic fitting 70 portions not in direct contact with the swaging tool, the swaging load becomes relatively weak, and no sufficient waterproofing effect is likely to be achieved. In that case, as shown in FIG. 4, it is desirable to adopt a configuration including a waterproofing resin 54 covering an end of the protecting section 3 fitted around outside the cylindrical portion 51. The waterproofing resin 54 may be formed by coating with a dispenser or the like, or may be formed by using a heat shrinkable tube. Adopting this configuration allows for securely preventing water ingress from the end of the protecting section 3, down an interface between the cylindrical portion 51 and the protecting section 3, into the electric cable 1.

Furthermore, as shown in FIG. 4, the cable clamp 50 may adopt a configuration including a cylindrical portion 55, which is formed opposite the cylindrical portion 51 with the flange 52 therebetween, a groove, which is formed around an outer circumferential surface of that cylindrical portion 55, and a ring shaped packing 56, which is mounted around that groove. The cylindrical portion 55 is formed integrally with the cable clamp 50 by being protruded opposite and coaxially with the cylindrical portion 51. The cylindrical portion 55, when the cable clamp 50 is attached to the electronic device chassis, is fitted into an engaging hole, which is provided in that chassis. The packing 56 then fulfills the waterproofing effect by contact with (adhesion to) an inner circumferential surface of the engaging hole. For this reason, the packing 56 allows for, when the harness 100 is attached to the electronic device chassis, effectively preventing water ingress into that chassis. Also, an end of the shield braid layer 8 may be folded back to outside the cylindrical portion 55 as indicated by dashed arrows in FIG. 4, so that the outer circumferential surface of the cylindrical portion 55 is covered with the folded portion of the shield braid layer 8. It results in the shield braid layer 8 being in contact with the cylindrical portion 55. It is therefore possible to, when attaching the cable clamp 50 to the electronic device chassis, electrically connect (ground) the shield braid layer 8 to the cable clamp 50 and the electronic device chassis.

Figure 5:
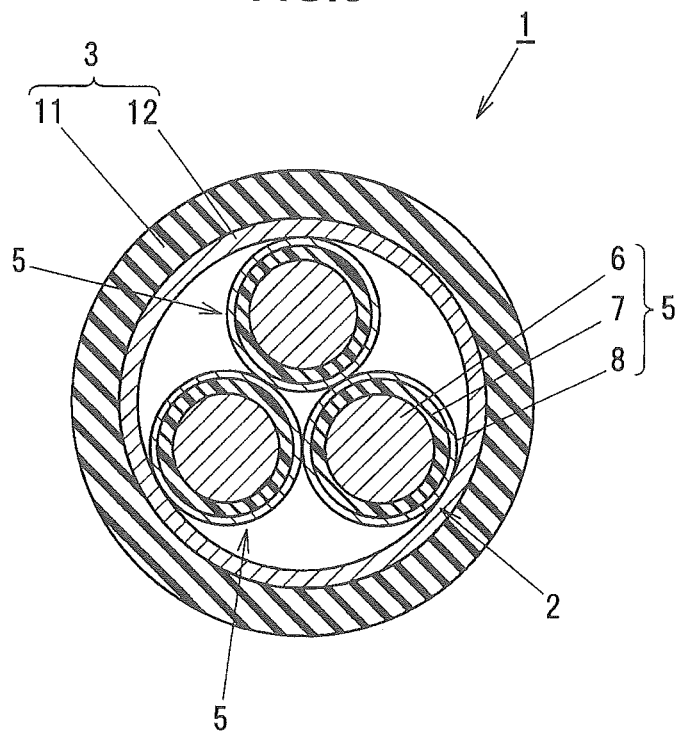
FIG. 5 is a cross sectional view (1) showing another configuration example of the electric cable.

Also, although in the above described embodiment, the electric wire section 2 is configured as one electric wire 5, this invention is not limited thereto, but the electric wire section 2 may be configured as multiple electric wires. A specific example is shown in FIG. 5: The electric wire section 2 may be configured as three electric wires 5. In this case, the three electric wires 5 may be straight wires each extending in the cable longitudinal direction, respectively, or may be wires stranded together.

Figure 6:
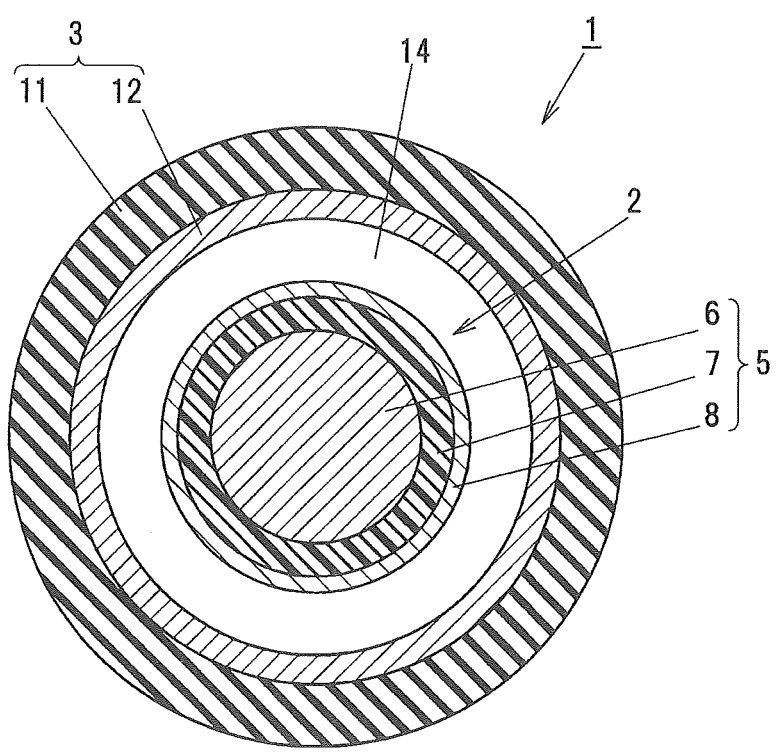
FIG. 6 is a cross sectional view (2) showing another configuration example of the electric cable.

Also, as shown in FIG. 6, the electric cable 1 may adopt a configuration including a hollow portion 14, which, by configuring the inner diameter of the protecting section 3 larger than the outer diameter of the electric wire section 2, is provided in the cylinder of the protecting section 3 to allow movement of the electric wire section 2. Adopting this configuration facilitates the fitting of the protecting section 3 around outside the cylindrical portion 51. Also, when the protecting section 3 is fitted around outside the cylindrical portion 51, no excessive force acts on the protecting section 3. For this reason, the mechanical load acting on the protecting section 3 when the electric cable 1 is bent is small. The configuration including the hollow portion 14 provided in the cylinder of the protecting section 3 to allow movement of the electric wire section 2 may be applied to when the electric wire section 2 is configured as multiple electric wires, as shown in FIG. 5, for example.

Also, although in the above described embodiment, the shield braid layer 8 is provided around the outer circumference of the constituent electric wire 5 of the electric wire section 2 while the reinforcing braid layer 12 is provided around the inner circumference of the protecting section 3, this invention is not limited thereto. For example, the above described embodiment may be configured in such a manner as to reverse the position for the shield braid layer 8 to be provided and the position for the reinforcing braid layer 12 to be provided. Also, the above described embodiment may adopt a configuration including the reinforcing braid layer 12 among constituent elements of the electric wire section 2 in such a manner that the shield braid layer 8 and the reinforcing braid layer 12 are provided on top of each other around the outer circumference of the electric wire 5, or a configuration including the shield braid layer 8 among constituent elements of the protecting section 3 in such a manner that the shield braid layer 8 and the reinforcing braid layer 12 are provided on top of each other around the inner circumference of the protecting section 3 and fitted around outside the cylindrical portion 51.

Also, an end face of the cylindrical portion 51 projecting in one thickness direction of the flange 52 may be formed into e.g., a so-called tapered surface shape, namely, a surface shape that its outer diameter is gradually reduced toward the projecting end of the cylindrical portion 51. Adopting this configuration allows the tapered surface of the cylindrical portion 51 to be used for a guiding surface to fit the protecting section 3 around outside the cylindrical portion 51. Also, the aforementioned tapered surface formed at the projecting end of the cylindrical portion 51 weakens the biting of the projecting end of the cylindrical portion 51 into the protecting section 3. This allows for mitigating the mechanical damage to the protecting section 3 resulting from bending of the electric cable 1.

Also, the cable clamp according to this invention may be applied to not only the case of fixing the terminal of the electric cable 1, but also the case of fixing a middle portion of the electric cable 1. In that case, the cylindrical portions 51 are provided in such a manner as to project in both thickness directions, respectively, of the flange 52 so that the protecting sections 3 are fitted around outside the cylindrical portions 51, respectively. Also, the ring shaped metallic fittings 70 are mounted around outside the protecting sections 3 respectively and externally swaged to grip the protecting sections 3.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A harness, comprising:
  an electric cable including:
    an electric wire section;
    a protecting section to protect the electric wire section; and
    a hollow portion configuring an inner diameter of the protecting section to be greater than an outer diameter of the electric wire section, the hollow is provided in the protecting section to allow movement of the electric wire section;
  a cable clamp including a cylindrical portion to, the electric wire section being inserted inside the cylindrical portion, the protecting section being fitted around an outside of the cylindrical portion and the hollow portion facilitating a fitting of the protecting section around an outside of the cylindrical portion; and
  a ring shaped metallic fitting being larger in diameter than the cylindrical portion and being mounted around outside the fitted protecting section,
  wherein the electric cable and the cable clamp are combined together by swaging of the mounted ring shaped metallic fitting,
  wherein the protecting section includes:
    a cylindrical sheath including an inner surface; and
    a braid layer covering the inner surface of the sheath,
  wherein the electric wire section includes a conductor and a shield braid layer provided around an outer circumferential side of the conductor,
  wherein at a swaged portion of the ring shaped metallic fitting, the sheath is in contact with an inner surface of the ring shaped metallic fitting at an outer periphery of the cylindrical portion while the braid layer is in contact with an outer surface of the cylindrical portion and the shield braid layer is in contact with an inner surface of the cylindrical portion, and
  wherein the cylindrical portion includes a tapered surface such that an outer diameter of the cylindrical portion is reduced toward a projecting end of the cylindrical portion to thereby weaken a biting of the projecting end of the cylindrical portion into the protecting section.

2. The harness according to claim 1, further comprising:
  a waterproofing resin covering an end of the protecting section fitted around outside the cylindrical portion.

3. The harness according to claim 1, wherein the braid layer covers an entirety of the inner surface of the sheath.

4. The harness according to claim 3, further comprising:
  a waterproofing resin covering an end of the protecting section and fitted around outside the cylindrical portion.

5. The harness according to claim 1, wherein the braid layer and the shield braid layer are adjacent to each other in a cable diametrical direction.

6. The harness according to claim 1, wherein at the swaged portion, a finely uneven surface of the braid layer is acted on by a tightening force resulting from the swaging, and thus bitten into the inner surface of the sheath.

7. The harness according to claim 6, wherein when acted on by a swaging force resulting from the swaging at the swaged portion, the braid layer is pressed against the sheath from a reaction force from the cylindrical portion, thereby the finely uneven surface of the braid layer is bitten into the inner surface of the sheath.

8. The harness according to claim 1, wherein an inner diameter of the cylindrical portion is equal to or greater than an outer diameter of the electric wire.

9. The harness according to claim 1, wherein at the swaged portion, the protecting section fitted around the cylindrical portion is sandwiched between the cylindrical portion and the ring shaped metallic fitting.

10. The harness according to claim 1, wherein at the swaged portion, a swaging force resulting from the swaging acts on the cylindrical portion with the protecting section between the cylindrical portion and the ring shaped metallic fitting thereby causing the swaging force not to be transmitted onto the electric wire section.

11. The harness according to claim 1, wherein when acted on by a swaging force resulting from the swaging at the swaged portion, the braid layer is pressed against the sheath by a reaction force from the cylindrical portion.

12. The harness according to claim 1, further comprising:
  a second cylindrical portion formed on an opposite side of the cylindrical portion;
  a flange disposed between the second cylindrical portion and the cylindrical portion;
  a groove formed around an outer circumferential surface of the second cylindrical portion; and
  a ring shaped packing which is mounted around the groove.

13. The harness according to claim 12, wherein the ring shaped packing comprises a waterproofing resin.

14. The harness according to claim 1, wherein an inner diameter of the cylindrical portion is greater than an outer diameter of the electric wire thereby forming a hollow portion between the protecting section and the electric wire section to allow movement of the electric wire section.

15. The harness according to claim 1, further comprising a hollow portion disposed between the protecting section and the electric wire section to allow movement of the electric wire section.

* * * * *